United States Patent [19]
McClintock

[11] Patent Number: 5,291,202
[45] Date of Patent: Mar. 1, 1994

[54] NOISE RADARS

[75] Inventor: William J. McClintock, Witham, England

[73] Assignee: GEC Avionics Limited, Rochester, England

[21] Appl. No.: 892,447

[22] Filed: May 13, 1986

[30] Foreign Application Priority Data

May 20, 1985 [GB] United Kingdom ............... 8512730

[51] Int. Cl.$^5$ .............................................. G01S 7/36
[52] U.S. Cl. ......................................... 342/16; 342/18; 342/132; 375/1
[58] Field of Search ............... 342/175, 189, 131, 132, 342/137, 145, 14, 16, 18; 380/33, 34; 375/1

[56] References Cited

U.S. PATENT DOCUMENTS

| | | | |
|---|---|---|---|
| 3,727,222 | 4/1973 | Hollis | 342/137 X |
| 4,042,925 | 8/1977 | Albanese et al. | 342/132 |
| 4,078,234 | 3/1978 | Fishbein et al. | 342/145 X |
| 4,142,189 | 2/1979 | Gleason | 342/145 X |
| 4,219,812 | 8/1980 | Rittenbach | 342/145 X |

FOREIGN PATENT DOCUMENTS

| | | |
|---|---|---|
| 2412852 | 8/1979 | France .................. 342/137 |
| 1404590 | 9/1975 | United Kingdom . |
| 1504118 | 3/1978 | United Kingdom . |
| 1506412 | 4/1978 | United Kingdom . |
| 1516659 | 7/1978 | United Kingdom . |
| 1528859 | 10/1978 | United Kingdom . |
| 2075788 | 1/1985 | United Kingdom . |

OTHER PUBLICATIONS

Skolnik, "Radar Handbook", 1970, 17-38—17-45.

Primary Examiner—Tod R. Swann
Attorney, Agent, or Firm—Spencer, Frank & Schneider

[57] ABSTRACT

In a noise radar a pseudo-random sequence is generated repeatedly and used to phase modulate a transmitted signal. The transmission is interrupted during a number of periods during each pseudo-random sequence which allows returns from targets to be received from the same antenna as is used for transmission during those periods of interruption. Each transmitted pulse, between successive periods of interruption, contains a different selection of successive digits of the code thus increasing the apparent randomness of the transmitted code and making detection more difficult.

20 Claims, 2 Drawing Sheets

NOISE RADARS

BACKGROUND OF THE INVENTION

This invention relates to a noise radar, i.e., a radar in which the transmitted signal is coded by a random or noiselike code. Such a code can be a long pseudo-random code for example greater than 1000 or preferably greater than 10,000 bits. Noise radar has a number of advantages. It can use a wide bandwidth transmission which gives good range resolution and good anti-jamming capabilities and low probability of being detected. It can also obtain low ambiguity in determining velocity and range of a target. Noise radar can also enable a low peak power to be used which further reduces the probability of detection.

In a known noise radar a continuous transmitted signal is coded, usually phase coded, in pseudo-random sequences of long duration. In the receiver the received signal is correlated with a delayed version of the transmitted signal to give an indication of the presence and velocity of a target at a range corresponding the delay. However noise radars have hitherto been little used because leakage of the transmitted signal directly into the receiver and indirectly from close range clutter limits the performance of the radar at long range as is the case with all continuous wave radars. Also, it is necessary to use separate transmit and receive antennas, since otherwise the amount of leakage would be intolerable.

Noise radar is not to be confused with phase coded pulse radar where transmitted pulses are phase coded to allow pulse compression and therefore good range resolution. In a phase coded pulse radar the relative timing of the transmitted and received pulses is used to indicate range. It is less successful in giving low ambiguity in determining velocity and range of a target than is a noise radar.

SUMMARY OF THE INVENTION

An aim of this invention is to provide all the advantages of a noise radar whilst eliminating the foregoing disadvantages.

This invention provides a noise radar comprising means for repeatedly generating a code comprising a sequence of digits and means for transmitting, during each sequence, pulses of energy occupying periods each of which spans at least one digit of the code, and means for modulating the transmitted energy in accordance with the prevailing output of the generator.

By pulsing the transmitted energy in this way an opportunity is given to receive the returned signal during periods between pulses thereby eliminating the leakage problem referred to above. Also, in cases where a pseudo-random code is used, the parts of the code applied to each pulse can, if the generator is operated continuously during and between pulses, be made particularly unpredictable, reducing the probability of detection. For this purpose the pulse repetition frequency is preferably not an integral multiple of the frequency of repetition of the pseudo-random code.

A facility can be provided to change the pulse repetition frequency, e.g., between two values to produce a frequency stagger; or between more than two values. The effect of this is to avoid blind spots in range and further to increase the aforementioned unpredictability. The frequency change can be such as to decrease the frequency when increasing the range to be examined and vice versa so as to remove range ambiguity completely.

In the receiver the code carried by the received signal is preferably correlated with an output of the code generator, after being passed through a delay corresponding to the round trip delay of the transmitted signal. The output of the correlator indicates the existence of a target or part of a target at a range corresponding to that delay. The delay is preferably varied in steps to make the radar responsive to different ranges at different times.

One way in which the invention may be performed will be described below by way of example with reference to the accompanying drawings.

DETAILED DESCRIPTION OF THE PREFERRED EMBODIMENT

Figure 2A:
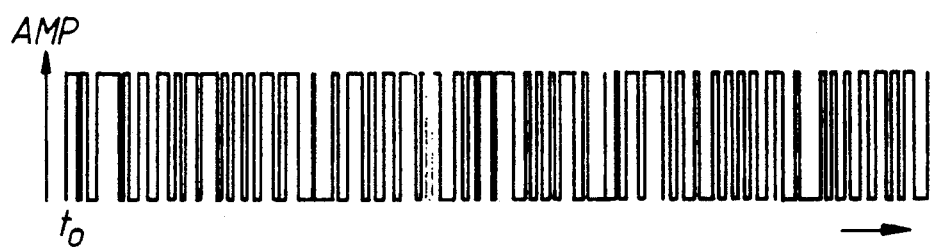
FIGS. 2A. 2B and 2C illustrate waveforms at three respective points on FIG. 1.
Figure 2B:
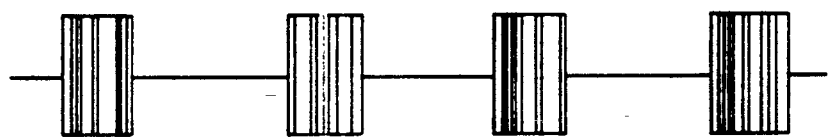

Referring to the drawings, a controller 1 contains a continuously running clock 1A which operates at a frequency of 100 MHZ and drives pseudo-random code generators 2 and 23 continuously until they are instructed to reset. A reset signal is applied to line 3 at regular time intervals determined by a timer 1B. The reset signal acts immediately to reset the code generator 2 and, after a delay imposed in delay 1C, to reset the code generator 23. The delay imposed by delay 1C determines the range currently under inspection. The pseudo-random code generator 2 generates a code as shown very schematically on FIG. 2A where the bit rate is shown greatly reduced for the purposes of illustration. This code is presented on line 4 to a bi-phase modulator 5 where it modulates a carrier frequency signal from an RF oscillator 6 to produce, on line 7, a bi-phase modulated signal. This signal is amplified in an amplifier 8 and up-converted to an output frequency by mixing in a mixer with a local oscillator signal provided from a local oscillator 10 via a splitter 11. The upper side band from mixer 9 is passed by a filter 12 and amplified by amplifier 13 before passing to a gate 14 where it is modulated by pulses provided on line 14A from a timer 1D in the controller 1. The gate 14 thus produces pulses as shown in FIG. 2B where the times when phase changes occur are indicated by the vertical lines.

Figure 2C:
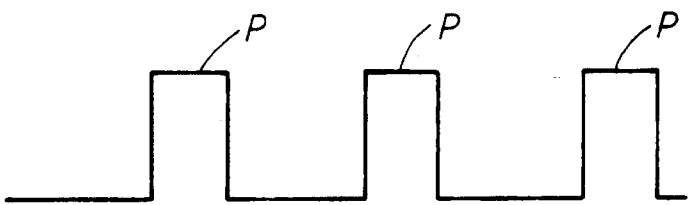

The output of the gate 14 is passed through a circulator 15 to an antenna 16 from whence it is transmitted to a region under inspection. Signals reflected from a target or targets in this region are received by the same antenna 16 and passed through the circulator 15 to a second gate 17. This gate 17 is operated by gating signals on line 17A supplied from the timer 1D via a variable delay 1E, the latter being selected to enable the receiver to be operating between and not during transmitted pulses. The gate 17 is thus caused to pass the received signal during received periods P as shown in FIG. 2C. The output of gate 17 is amplified in amplifier 18 and down-converted to an intermediate frequency by mixing in mixer 19 with the local oscillator signal. The lower side band is passed by a filter 20 and amplified in amplifier 21 to a suitable level for correlation in a mixer 22A.

The second pseudo-random code generator 23, which is identical to the generator 2, is clocked by the same clock signals as those which clock code generator 2. In this way the pseudo-random code generator 23 is caused to operate continuously like the generator 2. Its starting time is however determined by the reset signal on line 24 which is delayed relative to the time when the generator 2 starts. This delay is imposed via delay 1C and is selected so as to be equal to the round trip time of the signal to be transmitted and received from a target at a range currently selected for inspection.

The output of the pseudo-random code generator 23 is used in modulator 26 to bi-phase modulate a signal from the oscillator 6, which signal has been offset in frequency in Doppler offset circuit 25 by a variable amount set by a control signal on line 25A depending on the velocity of targets which it is, for the time being, desired to inspect. This signal can be supplied from a computer or, in a simple version of the invention could be set manually.

The output of the modulator 26 is mixed in a mixer 22A with the returned signals from amplifier 21. The output of the mixer 22A is passed through a low pass filter 22B and the returns from successive pulse periods are integrated in an integrator 22C. The integrator 22C can be a bandpass filter with a bandwidth which is the reciprocal of the integration time. Alternatively it can be a digital fast Fourier transform device. The components 22A, 22B and 22C constitute a correlator by which an output waveform is produced at 22D, with the magnitude of this output waveform indicating the strength of the return signal; and its frequency components indicating the Doppler components of the received signal.

In the illustrated system it is notable that the ambiguity of range determination is dictated by the length of the code and not by the pulse repetition frequency. In order to reduce range ambiguity even further, more than one different pseudo-random code generator can be included at 2 and at 23 respectively, these being arranged to operate in sequence and constructed so as to produce codes of the same or different lengths. The same effect can be achieved by using sequencially different tapping points on the shift register of the pseudo-random code generators but in that case the code lengths will always be the same. In this Specification the term "pseudo-random sequence" is to be considered to include a sequence of different pseudo-random sequences. e.g., generated in one of the manners mentioned in the immediately preceding paragraph.

Figure 1:
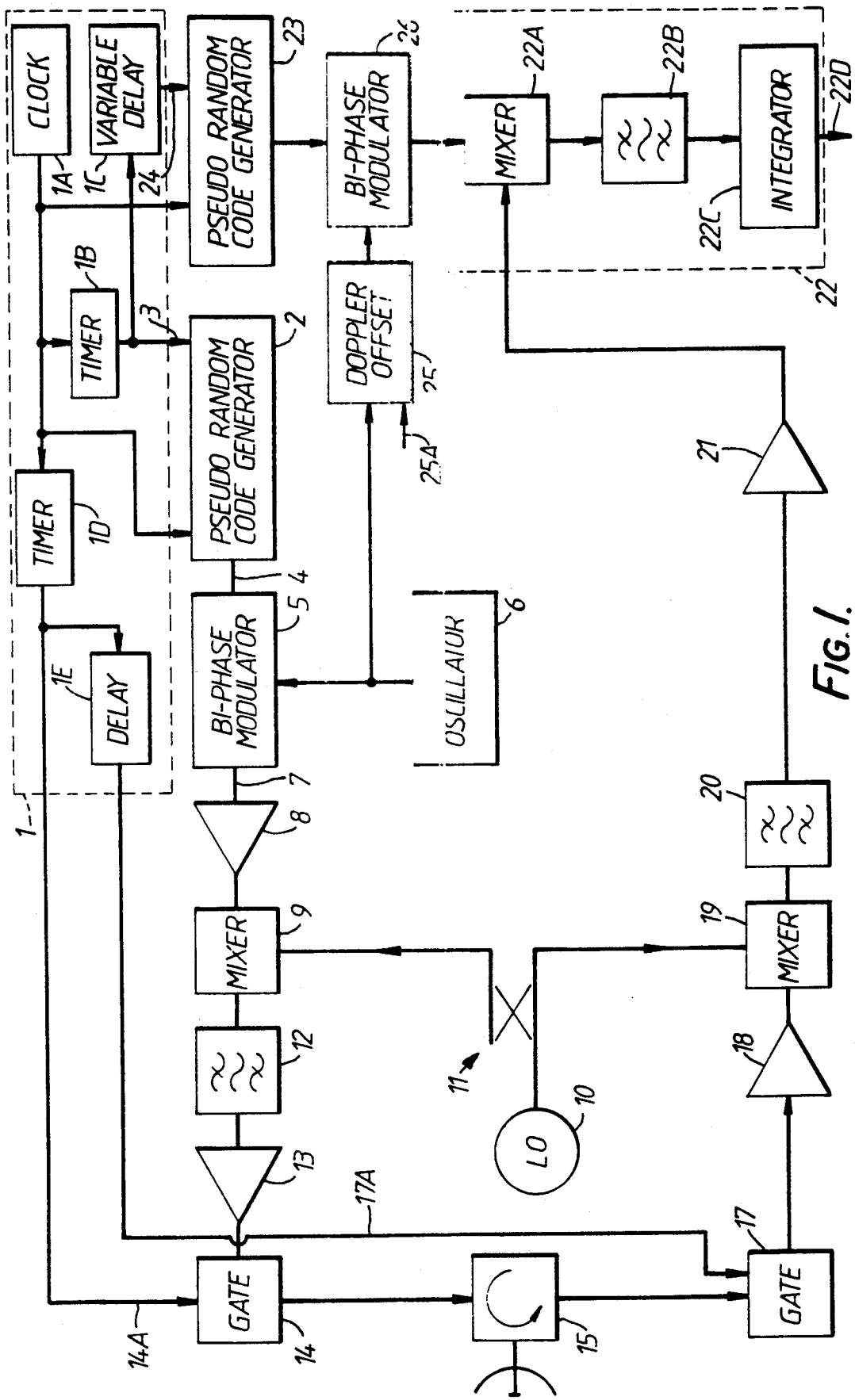
FIG. 1 is a block circuit diagram illustrating a noise radar constructed in accordance with the invention.

It would, in theory, be possible to use just one code generator instead of the two shown at 2 and 23 on FIG. 1. A digital delay would then be needed to connect the output of the single code generator to the modulator 26. Such an arrangement would be difficult in practice using existing technology since a delay of perhaps 10,000 digits may be required.

In an alternative embodiment of the invention a number of correlators and modulators, like those shown at 22 and 26 are included. These are arranged to receive inputs from circuitry 21 and 25 via splitters. The inputs to the different modulators are taken from a shift register which receives the output of the pseudo-random code generator 23. The effect of this is to give simultaneous outputs from each correlator representing targets in different range cells, either contiguous or spaced.

It should be noted that the choice of the periods when the gates 14 and 17 are open is made purely for the purpose of preventing leakage of the transmitted signal into the receiver and of preventing returns being received from close-in clutter. These "pulse" periods are of no significance in determining range in contrast to the pulses produced in a phase coded pulse radar. The radar of this invention, illustrated in FIG. 1, can be looked upon as an interrupted continuous wave radar.

An improvement in performance can be obtained by stopping the generation of the pseudo-random sequence during the periods when transmission is not taking place. This enables the pseudo-random sequence to be spread over a larger number of pulses without being repeated, resulting in a improvement in unambiguous range. Furthermore the whole of the code generated by generator 23 is then usefully correlated in correlator 22 with the received signal, thus improving the range sidelobe performance.

If it is desired to track a target moving fast towards or away from the radar, the Doppler offset applied at circuit 25 cannot compensate over the large bandwidth of the received signal for code compression or expansion due to the target movement. This problem can be solved by expanding or compressing the code generated by generator 23 by using a slightly different frequency of signal for clocking the pseudo-random code generator 23. This makes the code sequence shorter or longer in duration. The controller 1 obtains the target velocity and range information necessary to initiate a tracking sequence either from the information at 22D or from a separate surveillance radar.

Whilst the illustrated embodiment of the invention utilizes biphase modulation, other forms of modulation such as quadraphase mdoulation can alternatively be employed. In a system using quadraphase modulation, each code generator 2 and 23 would be replaced by twin code generators to give two-digit words which define the phase modulation applied at circuits equivalent to circuitry 5 and 26.

I claim:

1. A noise radar comprising: means for repeatedly generating a code comprising a sequence of digits; means for transmitting, during each sequence, pulses of energy occupying periods each of which spans at least one digit of the code, with the pulses having a regular pulse repetition frequency which is not an integral multiple of the repetition frequency of said code; means for changing said pulse repetition frequency; and means for modulating the transmitted energy in accordance with the prevailing output of the generator.

2. A radar according to claim 1 in which each pulse period spans more than one digit.

3. A radar according to claim 2 in which the generator is a pseudo-random code generator.

4. A noise radar as defined in claim 3 wherein successive ones of he modulated said transmitted pulses contain a different sequence of successive digits of said pseudo-random code.

5. A noise radar as defined in claim 2 wherein successive ones of the modulated said transmitted pulses contain a different sequence of successive digits of said code.

6. A radar according to claim 1 including clock means for clocking the generator continuously during and between pulses.

7. A radar according to claim 1 including clock means arranged to clock the generator and means for preventing the clock from operating between pulses.

8. A radar according to claim 1 comprising a receiver and a receiver protection gate for accepting the received signal during periods between transmitted pulses.

9. A radar according to claim 8 in which the receiver protection gate rejects the received signal during a period immediately following each transmitted pulse to exclude returns from short range clutter.

10. A radar according to claim 8 further comprising a delay device for delaying the code and a correlator arranged to correlate the code at the output of the delay device with the code carried by the received signal and delayed by the transit time to and from a target.

11. A noise radar as defined in claim 9 further comprising a delay device for delaying the code and a correlator arranged to correlate the code at the output of the delay device with the code carried by the received signal and delayed by the transit time to and from a target.

12. A noise radar as defined in claim 1 in which the generator is a pseudo-random code generator.

13. A noise radar comprising: generator mans for repeatedly generating a digital code; means for transmitting pulses of energy occupying periods each of which spans at least one digit of the code, with said pulses having a regular pulse repetition frequency which is not an integral multiple of the repetition frequency of said digital code; means for changing said pulse repetition frequency; and means for modulating the transmitted energy in accordance with the coded output of said generator means.

14. A noise radar according to claim 13 wherein said generator means is a pseudo-random code generator which repeatedly generates said digital code.

15. A noise radar according to claim 13 further comprising: receiver means for receiving returns of the transmitted signal during periods between transmitted pulses; and means for correlating the code carried by the received signal with a delayed version of the code used to modulate the transmitted pulses, thereby obtaining an indication of the presence or absence of a target at a range corresponding to the delay.

16. A noise radar according to claim 15 further including clock means for clocking said generator means continuously during and between pulses.

17. A noise radar according to claim 15 wherein each pulse period spans more than one digit.

18. A noise radar as defined in claim 17 wherein successive ones of the modulated said transmitted pulses contain a different sequence of successive digits of said digital code.

19. A noise radar according to claim 17 wherein said generator means is a pseudo-random code generator which repeatedly generates a pseudo-random said digital code.

20. A noise radar as defined in claim 19 wherein successive ones of the modulated said transmitted pulses contain a different sequence of successive digits of said pseudo-random digital code.

* * * * *